United States Patent [19]

Baumgarten

[11] Patent Number: 5,167,894
[45] Date of Patent: Dec. 1, 1992

[54] APPARATUS COMPRISING AN EXTRUDER AND A CALENDER FOR PRODUCING SHEETS AND/OR FOILS FROM PLASTIC OR RUBBER MIXTURES

[75] Inventor: Wilfried W. Baumgarten, Pattensen, Fed. Rep. of Germany

[73] Assignee: Paul Troester Maschinenfabrik, Hanover, Fed. Rep. of Germany

[21] Appl. No.: 675,663

[22] Filed: Mar. 27, 1991

[30] Foreign Application Priority Data

Mar. 28, 1990 [DE] Fed. Rep. of Germany ....... 4009917

[51] Int. Cl.⁵ .................. B29B 7/56; B29C 47/32
[52] U.S. Cl. ................. 264/175; 264/210.2; 264/310; 264/40.5; 264/40.7; 425/145; 425/192 R; 425/194; 425/327; 425/367
[58] Field of Search ............. 264/175, 280, 210.2, 264/349, 310, 177.1, 40.7, 177.17, 177.16; 425/327, 194, 192 R, 162, 163, 135, 150, 367, 466, 325, 145

[56] References Cited

U.S. PATENT DOCUMENTS

| | | | |
|---|---|---|---|
| 3,274,645 | 9/1966 | Chase | 425/367 |
| 3,482,279 | 12/1969 | Anders et al. | 425/192 R |
| 3,902,835 | 9/1975 | Theysohn | 425/192 R |
| 3,947,201 | 3/1976 | Ellwood | 425/466 |
| 4,354,814 | 10/1982 | Grimminger et al. | 425/194 |
| 4,484,879 | 11/1984 | Heinz | 425/327 |
| 4,708,616 | 11/1987 | Humer | 425/150 |
| 4,963,309 | 10/1990 | Gohlisch et al. | 264/175 |
| 5,007,816 | 4/1991 | Hehl | 425/135 |

Primary Examiner—Jeffery Thurlow
Assistant Examiner—Mathieu Vargot
Attorney, Agent, or Firm—Robert E. Burns; Emmanuel J. Lobato

[57] ABSTRACT

Apparatus for producing sheets or foils of plastic or rubber mixtures includes a calender having two rollers rotatably supported by spaced calender stands with a gap between the rollers and an extruder having an extruder head with wide mouth for extruding a sheet of material into the roller gap of the calender. One part of the extruder head is fixed while another part is pivoted for movement relative to the fixed part by a cylinder-piston unit. The calender is stationary while the extruder is mounted by screws, providing vertical adjustment, on a base having wheels for horizontal movement of the extruder toward and away from the calender to vary the distance between the extruder mouth and the roller gap of the calender. The base of the extruder is coupled with the calender by a threaded spindle rotatable through a reducing drive by a reversible motor to move the extruder toward and away from the calender.

11 Claims, 4 Drawing Sheets

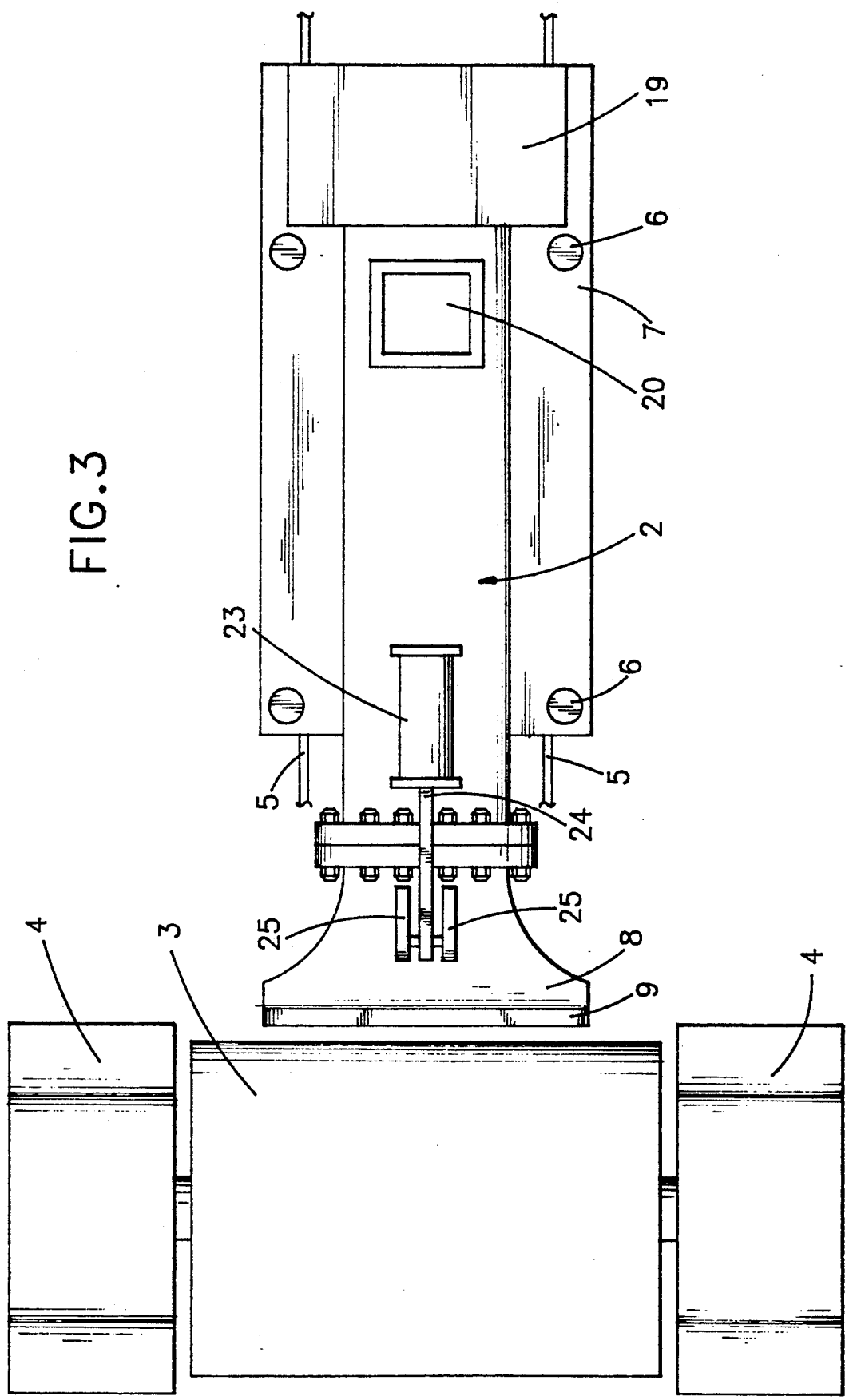

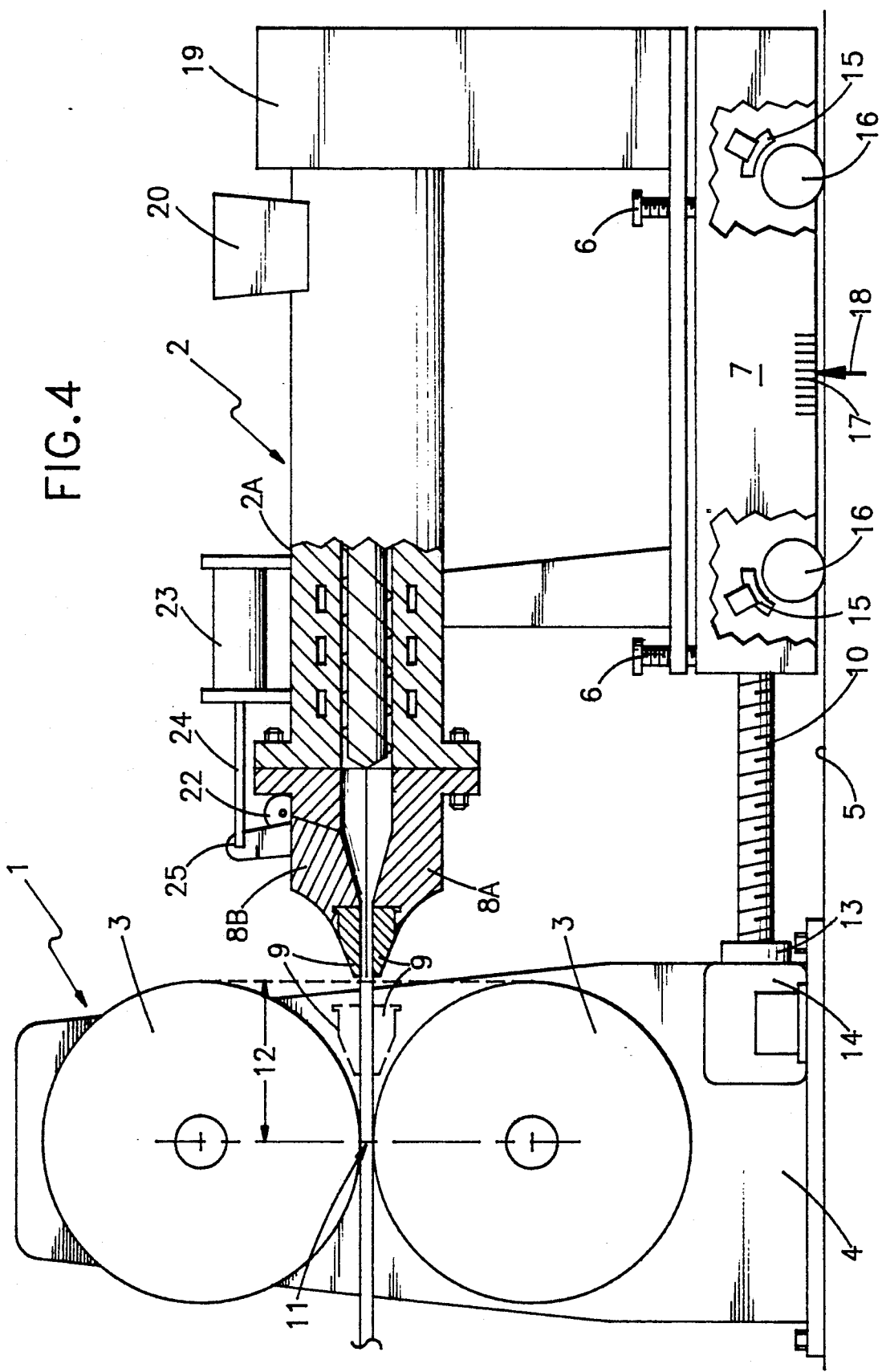

APPARATUS COMPRISING AN EXTRUDER AND A CALENDER FOR PRODUCING SHEETS AND/OR FOILS FROM PLASTIC OR RUBBER MIXTURES

FIELD OF INVENTION

The invention relates to apparatus consisting of an extruder and a calender for producing sheets and/or foils of plastic or rubber mixtures, in which the extruder is provided with an extrusion head for widely distributing the mass to be extruded, of which the forming bars are removably mounted.

BACKGROUND OF THE INVENTION

For many years production apparatus consisting of an extruder and a calender has been used for producing sheets and/or foils of plastic material or rubber mixtures. If a fully homogenized and disintegrated extrudant leaves the extruder head at a proper temperature, the calender serves merely as a smoothing, cooling and/or calibrating device. In this case there occurs in the roller gap, in advance of the narrowest part of the gap, merely a limited bulging of the extrudant produced by an accumulation of the extrudant in front of the narrowest part of the roller gap. As the calender, like the extruder, can carry out the work of mixing, homogenizing, disintegrating and tempering the extrudant when a considerably accumulation of material forms in front of the narrowest part of the roller gap, there occurs in the roller gap a rotary movement and kneading action, so that the accumulated material is kneaded, whereby it is possible to use in the extruder-calender combination an extruder that does not fully homogenize, mix and disintegrate the material, but a part of this work is left to the calender.

The formation and the size of the bulge of material accumulating in the roller gap is solely dependent on technical measures, namely on the relation of the amount of extruded material introduced into the roller gap to the size of the roller gap and rate of rotation of the rollers. In the production, the apparatus is adjusted in the starting process to obtain the desired size of the accumulation of material to be kneaded and during the production, the desired size of the accumulation of material is obtained through control of the forenamed parameters.

On the contrary, the thickness of the sheet or foil produced is largely dependent on the gap width of the mouth of the extruder head. Hence, for many years extruder heads have been produced with interchangeable and/or adjustable forming bars so that different thicknesses of sheets or foils could be produced. However, there is still a further reason for the removabilty of the forming bars. For the width-wise distribution of the mass, the walls of the flow paths of the extrudant in the extruder head must have a particular form which cannot always be determined purely theoretically. Hence the flow paths for the extrudant must often be altered through test runs of the production apparatus. So that the heavy extruder head parts do not have to be clamped on the reworking machine, the forming bars are removably mounted so that only the forming bars, without other parts of the extruder head, can be clamped on the reworking machine. Also with material change of the production equipment, an exchange of the forming bars can be necessary.

In order to be able to alter the contact of faces of the rollers with the kneaded material and thereby alter the disintegrating, mixing and homogenizing work carried out in the roller gap, it is known through DE-OS 24 50 225 to make a forming bar pair of the extruder head replaceable by another forming bar pair which extends further or not so far in the roller gap. These forming bar pairs can also have different gap widths for the flow of the material to be extruded. However these measures have considerable disadvantages. They make it necessary, for the exchange of the forming bar pairs, to shut down the equipment, move the calender and extruder further apart and only then carry out the exchange of extruder bars. A continual alteration during operation of the equipment is not possible.

SUMMARY OF THE INVENTION

The present invention eliminates the disadvantages of the state of the art. It is the object of the invention to provide a simple possibility, in production apparatus consisting of an extruder and a calender, of achieving an alteration of the contact length of the kneaded mass on the roller circumferences without exchanging forming bar pairs.

The invention consists therein that the extruder or the calender is mounted for horizontal movement and that between the extruder and the calender there is arranged a coupling device which makes possible a finely adjustable variation of the spacing between the extruder and the calender so that the distance of the forming bars of the extruder head from the rollers of the calender in the roller gap can be varied from a minimum value, in which the forming bars are almost in contact with the rollers, to a maximum value in which the forming bars are outside the roller gap.

This coupling device can be adjusted during operation of the apparatus so that, without any exchange of the forming bars, the contact surface of the kneaded mass with the calender rollers is continuously variable. In this manner it is possible to obtain optimal production conditions and, thereby, optimal products. This adjustment is possible in a simple manner without any interruption of production. This leads thereto that the operating crew of the apparatus consisting of an extruder and a calender can use this possibility of adjusting the kneaded mass.

Structurally this coupling device can be produced in a very simple manner in that the coupling device comprises a threaded spindle. This permits a continual variation of the penetration of the forming bars of the extruder head into the roller gap of the calender.

It is advantageous when still a further coupling device is arranged between the extruder and the calender in order to provide a fine adjustment not only in one direction, but also obtain optimal alignment of the extruder with the wide extruder head to the calender.

For many applications it can be advantageous when an adjustment also in the vertical dimension is possible. That can be achieved by making the horizontally moveable part or the stationary part vertically adjustable.

It is advantageous when the horizontally moveable part is provided with means for blocking the movement. After adjustment to obtain an optimal kneaded mass, this blocking device can be activated in order to fix the adjustment and unload the coupling device.

For the vertical adjustment possibility, it is advantageous when the vertically adjustable component (calender or extruder calender) is mounted in a vertically adjustable manner on a base and the coupling device acts between such a base and the other component.

It is advantageous to make one of the forming bars, of the forming bar pair, of the extruder head stationary and to make the other forming bar of the pair movable and to provide hydraulic means for moving the movable forming bar. Moreover in order to make the gap width of the extruder adjustable, it is advantageous when a forming bar or a pair of forming bars is interchangeable with another or others of different gap width.

BRIEF DESCRIPTION OF THE DRAWINGS

The essence of the invention will be further understood from the following description of preferred embodiments shown schematically in the accompanying drawings in which:

FIG. 3 is a schematic plan view of the apparatus, and FIG. 4 is a schematic side elevation, partially in section, of another embodiment of the apparatus.

DESCRIPTION PREFERRED EMBODIMENTS

Figure 1:
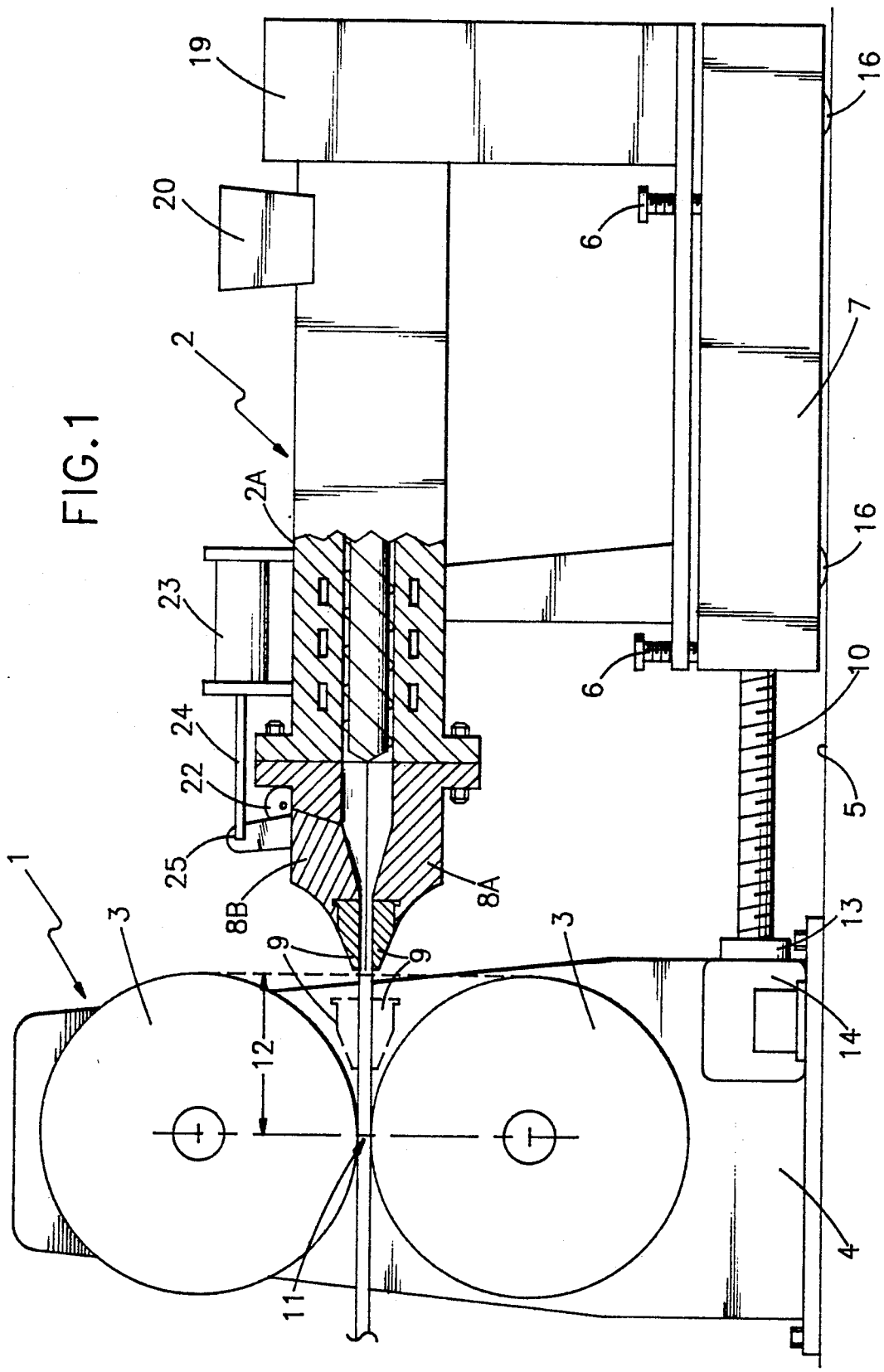
FIG. 1 is a schematic side elevation, partially in section, of production apparatus in accordance with the invention.
Figure 2:
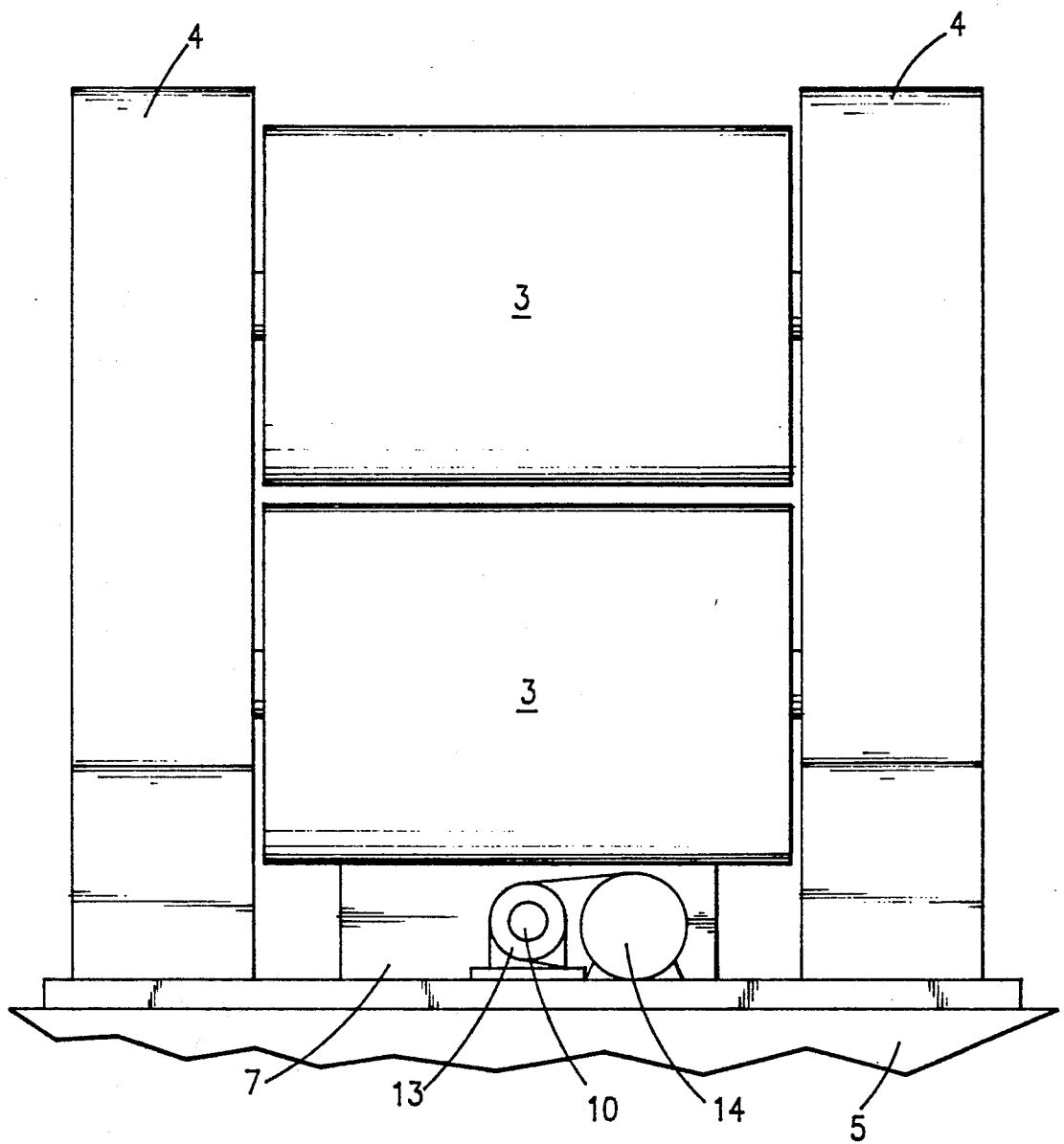
FIG. 2 is an elevation of the calender on the discharge side

The apparatus shown by way of example in FIGS. 1, 2 and 3 of the drawings comprises a calender 1 and an extruder 2. The calender comprises two calender rollers or cylinders 3 rotatably mounted between calender stands 4 which are mounted stationary on the floor 5. The two rollers 3 of the calender are spaced apart to form a gap between the rollers.

The extruder 2 comprises a housing 2A in which is rotatable an extruder screw 21 driven by a motor and drive in a housing 19. The material to be extruded is introduced into the extruder through a hopper 20.

An extruder head secured to the forward end of the housing 2A by bolts comprises a fixed extruder head portion 8A and a movable extruder head portion 8B which is pivotally connected with the fixed extruder head portion A by a hinge or pivot 22. The movable extruder head portion 8B is pivotally movable between an operative position shown in the drawing and an open position (for cleaning) by means of a hydraulic cylinder-piston unit 23 of which the piston rod 24 is connected with a pair of arms 25 on the movable extruder head portion 8B.

In the extruder head portions 8A and 8B there are mounted two forming bars 9 which define the extruder mouth through which material, propelled by the extruder screw 21, is extruded in the form of a sheet directed toward the roller gap of the calender 1. The forming bars 9 are removably secured in the respective extruder head parts and are replaceable by other forming bars which define a different gap width of the extruder mouth for extruding sheets of different thicknesses.

The extruder 2 is mounted by vertically adjustable feet 6 on a base 7 which is movably supported on the floor 5 by rollers or wheels 16 for movement of the extruder toward and away from the calender by means of a threaded spindle 10 which engages a threaded nut or follower (not shown) in the extruder base 7 and is rotatable through a reduction drive 13 by a reversible motor 14. The motor 14 is controlled manually or automatically, for example by means for optically or tactically sensing the bulge of material that forms in advance of the narrowest part 11 of the roller gap of the calender.

By means of the vertically adjustable feet 6, the position of the extruder 2 can be adjusted vertically relative to the calender so that the extruder mouth is properly at the same level as the roller gap of the calender and thus directed toward the roller gap. By means of the threaded spindle 10, the extruder can be moved, in a precise manner, toward and away from the calender to vary the distance between the forming bars 9 of the extruder mouth and the narrowest part 11 of the roller gap of the calender between a minimum distance (shown in dotted lines in FIG. 1) in which the forming bars are almost in contact with the calender rollers and a maximum distance (shown in solid lines) in which the forming bars 9 of the extruder mouth are outside the roller gap as defined by a tangent (shown in dotted lines) to the two calender rollers.

Instead of single threaded spindle 10 which is centrally located as shown in FIG. 2, there may desirably be two laterally spaced spindles 10, located in line with the two calender stands and individually controlled so as to provide not only precise spacing between the extruder and the calender but also angular alignment of the extruder relative to the calender.

In FIG. 4 there is shown another embodiment of the invention in which the wheels 16 of the extruder base 7 are provided with brakes 15 for braking the wheels 16 and thereby securing the extruder in fixed position after it has been moved to the desired position, relative to calender 1, for example by a threaded spindle as in the embodiment of FIGS. 1 to 3. The braking of the wheel 16 by means of the brakes 15 unloads the means for moving the extruder toward or away from the calender. The brakes 15 are operated manually or automatically in conjunction with the means for moving the extruder so as to apply the brakes when the extruder has been moved to the deisred position.

Moreover in FIG. 4, there is shown a scale 17 which is provided on the extruder base 7 and cooperates with a pointer or indicator 18 on the floor 5 to indicate precisely the position of the extruder.

It will be understood that the construction and operation the apparatus shown in FIG. 4 is the same as that of the apparatus shown in FIGS. 1 to 3, except as otherwise described, and that features one embodiment can be incorporated, where applicable, in the other embodiment.

What I claim is:

1. Apparatus for producing sheets of a plastic or rubber mixture, said apparatus comprising two components, namely
   a calender comprising two rollers disposed one above another and rotatably mounted between calender stands, said rollers being spaced apart a predetermined distance to form a roller gap between said rollers, and
   an extruder comprising a housing, an extruder head having a wide extruder mouth defined by opposed, straight, parallel forming bars spaced apart from one another by a predetermined distance to produce a sheet of predetermined thickness, an extruder screw in said housing for propelling said mixture into said extruder head and out of said extruder mouth in the form of a sheet, said extruder mouth being positioned to direct said sheet toward said roller gap of said calender and means for rotating said extruder screw at a rate to form in said extruded sheet, between said mouth of said extruder and said roller gap, an accumulation of material in the form of a bulge in which there occurs a rotary movement and kneading of said material produced by contact with circumferences of said rollers, means for supporting one of said components for movement toward and away from the other of said components, and coupling means between said extruder and said calender for effecting, during operation of said apparatus, a finely adjustable variation of the spacing between said extruder and said calender to vary the distance of said parallel forming bars of said extruder head from said rollers of said calender between a minimum value, in which said forming bars are almost in contact with said rollers of said calender and a maximum value in which said forming bars are outside of said roller gap.

2. Apparatus according to claim 1, in which said coupling means for moving said one component comprises a threaded spindle extending between said components and means for rotating said spindle for varying the distance between said components.

3. Apparatus according to claim 2, in which said means for rotating said spindle comprises a reversible motor and a reduction drive coupling said motor with said spindle.

4. Apparatus according to claim 1, further comprising means for releasably securing said one component in fixed position when at a selected distance from the other component.

5. Apparatus according to claim 1, in which one of said components is supported for vertical adjustment of said one component relative to the other component.

6. Apparatus according to claim 2, further comprising a base supporting said extruder and means for vertical adjustment of said extruder on said base, said spindle extending between said calender and said base.

7. Apparatus according to claim 1, in which said forming bars are removably secured in said extruder head and are interchangeable with other forming bars providing a different gap width between forming bars.

8. Apparatus according to claim 1, in which said extruder head comprises one fixed part and one movable part which is movable toward and away from said fixed part and means for moving said movable part.

9. Apparatus according to claim 8, in which said movable part is pivoted and has an arm projecting from said part, and in which said means for moving said movable part comprises a piston-cylinder unit connected with said arm.

10. A method for producing sheets of a plastic or rubber mixture with apparatus comprising two components, namely a calender comprising two rollers disposed one above another and rotatably mounted between calender stands, said rollers being spaced apart a predetermined distance to form a roller gap between said rollers, and an extruder comprising a housing, an extruder head having a wide extruder mouth defined by opposed, straight parallel forming bars spaced apart from one another by a predetermined distance to produce a sheet of predetermined thickness, an extruder screw in said housing for propelling said mixture into said extruder head and out of said extruder mouth in the form of a sheet of predetermined thickness and means for rotating said screw, said method comprising positioning said extruder head relative to said calender rollers so that said sheet extruded from said extruder mouth is directed toward said roller gap of said calender, with a length of said sheet extending freely from said extruder mouth to said roller gap, rotating said extruder screw at a rate to form in said extruded sheet, between said mouth of said extruder and said roller gap, an accumulation of material in the form of a bulge in which there occurs a rotary movement and kneading of said material produced by contact with circumferences of said rollers, supporting one of said components for movement toward and away from the other of said components, and coupling said extruder and said calender with coupling means located between said extruder and said calender for effecting during operation of the apparatus a finely adjustable variation of the spacing between said extruder and said calender to vary the distance of said parallel forming bars of said extruder from said rollers of said calender between a minimum value, in which said forming bars are almost in contact with said rollers of said calender and a maximum value in which said forming bars are outside of said roller gap.

11. A method according to claim 10, further comprising varying the height of one component relative to the other component during operation of the apparatus.

* * * * *